Dec. 24, 1968 — W. G. A. TROLLOPE — 3,417,843
DISC BRAKE FOR MINE HOISTS
Filed Oct. 26, 1966 — 3 Sheets-Sheet 1

INVENTOR.
WILLIAM G. A. TROLLOPE

INVENTOR.
WILLIAM G. A. TROLLOPE

INVENTOR.
WILLIAM G. A. TROLLOPE

United States Patent Office 3,417,843
Patented Dec. 24, 1968

3,417,843
DISC BRAKE FOR MINE HOISTS
William G. A. Trollope, Sherbrooke, Quebec, Canada, assignor to Canadian Ingersoll-Rand Company Limited, Montreal, Quebec, Canada, a corporation of Canada
Filed Oct. 26, 1966, Ser. No. 589,689
10 Claims. (Cl. 188—170)

ABSTRACT OF THE DISCLOSURE

A spring-applied, fluid-released disc brake including a pivoted yoke carrying a pair of brake shoes on opposite sides of the disc whereby a spring-applied bearing of one shoe against the disc sets up a reaction in yoke causing the other shoe also to bear against the disc. Other springs cooperate with pressurized fluid to retract the shoes from the disc.

---

This invention relates to brakes and especially, but not exclusively, to disc brakes adapted for use with mine hoists.

In some prior mine hoist disc brakes, fluid under pressure is used to apply the brakes and springs are used to release the brakes. This necessitates some means for insuring that if the supply of fluid under pressure for some reason fails, the brake can still be applied. In other prior disc brakes, if the brake disc is for some reason wavy or warped, the brakes will not be applied evenly and steadily. In prior spring-applied, pressure released brakes, it has been found that when one of a plurality of springs fails, the total force applied by the springs decreases by an amount greater than the force supplied by that single spring.

It is the principal object of this invention to provide a brake which has an improved actuating system.

It is another object of this invention to provide a new brake which is reliable yet requires no back-up device to insure that the brake is applied.

It is a further object of this invention to provide a brake which has relatively few moving parts.

In general, these objects are carried out by providing a braking system including a brake disc with a pair of brake shoes carried by a frame so as to extend on opposite sides of the brake disc. Each brake shoe is fixed to a leaf spring and the leaf spring is mounted on the frame. Means are provided for biasing one of said brake shoes into gripping engagement with one side of the disc. Means are pivotally mounted on the frame connecting the biasing means and the other of said brake shoes for transferring the biasing force from the biasing means to the other brake shoe and for resisting the forces axial to the brake disc developed by the brake shoes gripping the disc. Fluid pressure above a predetermined minimum is applied to the biasing means to allow the leaf springs to force the brake shoes out of gripping contact with the brake disc.

The aforementioned and other objects will become apparent from the following description and drawings in which.

Figure 1:
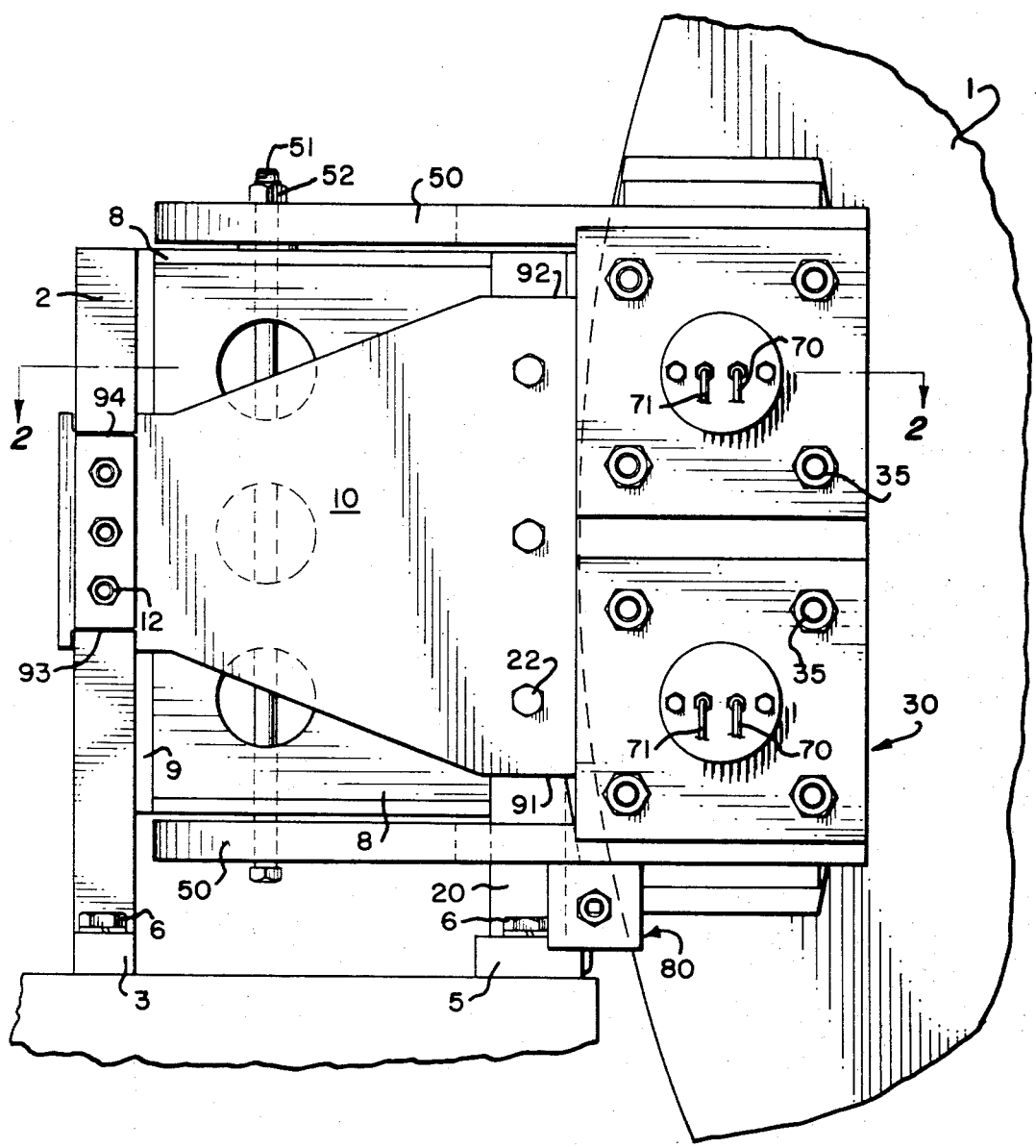
FIG. 1 is an elevation of an embodiment of this invention showing a portion of the brake disc.
Figure 2:
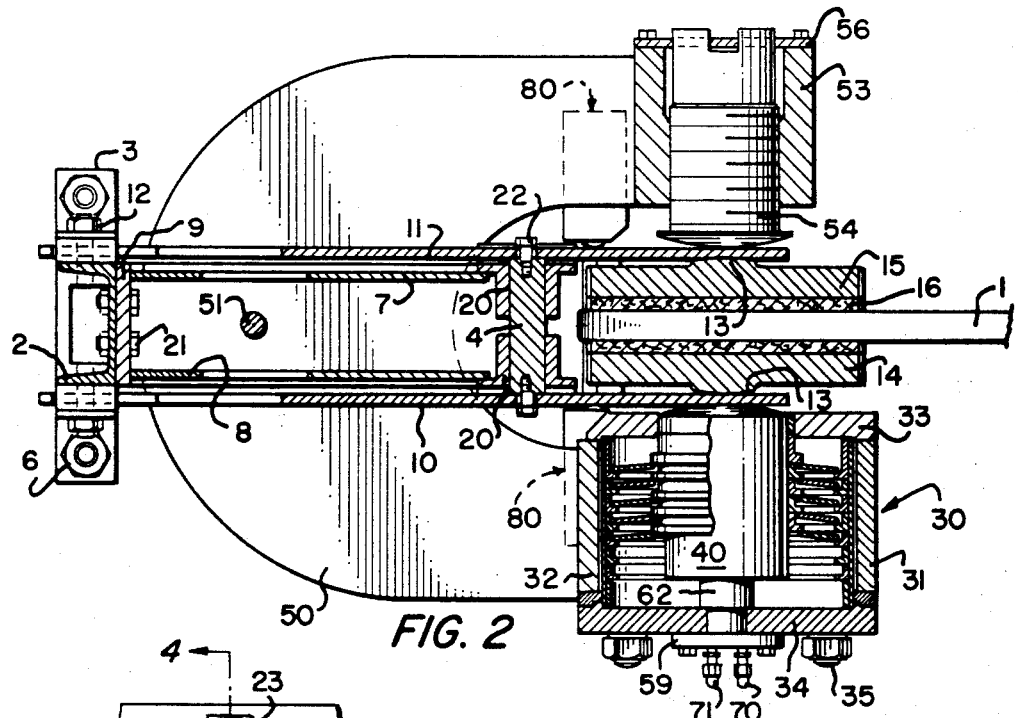
FIG. 2 is a partial section taken on the line 2—2 of FIG. 1 with the brake system in the brake-on position.

Referring to the drawings there is a brake disc 1 which, when the invention is used with a mine hoist, will be fixed to or part of a hoist drum (not shown) which is mounted for rotation about an axis.

The brake includes a frame which comprises a channel beam 2 which is welded to a cross member 3. The frame also includes a beam 4 welded to a cross member 5. There are angle braces 20 welded to the beam 4. Plates 7 and 8 are welded at one end to the beam 4 and angle braches 20 and at their other end to a plate 9 to form a single piece. The plate 9 and thus the entire piece formed by the plates 7, 8 and 9 and the beam 4 is bolted to the channel 2 by bolts 21 to complete the frame. The two-piece construction of the frame allows easy assembly of the brake unit. The two cross members 3 and 5 are bolted to a base or the floor by bolts 6.

A pair of leaf springs 10 and 11 are secured to the frame at the channel beam 2 by bolts 12 and against the beam 4 by bolts 22 to provide a fulcrum for the springs at the beam 4. These springs extend beyond the beam 4 on each side of the disc 1.

Figure 3:
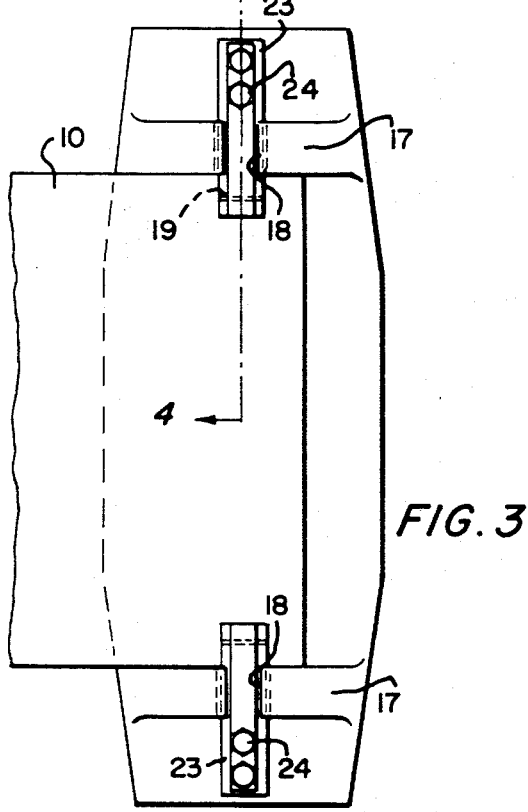
FIG. 3 is a detail of a portion of the invention.
Figure 4:
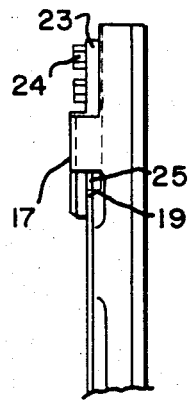
FIG. 4 is a section taken on the line 4—4 of FIG. 3.

Brake shoes 14 and 15 which have friction material 16 bonded or otherwise atttached thereto are secured to the springs 10 and 11. As best shown in FIGS. 3 and 4, the brake shoes 14 and 15 are each provided with a pair of shoulders 17 having a grooved slot 18 therethrough. Each spring 10 and 11 is provided with a pair of slots 19. A key 23 is adapted to fit through the slot 18 and has a tongue 25 which engages the slot 19 in the spring. The key is then secured to the brake shoe by bolts 24. The keys 23 hold the brake shoes 14 and 15 against the spring plates 10 and 11 and the tongue 25 engaging the slot 19 prevents side movement. This insures that when either the spring or the brake shoe moves, the other will also move. The leaf springs 10 and 11 serve two functions. First, they act as release springs for moving or forcing the brake shoes away from the disc when the brakes are released. Second, they resist the braking force tangential to the brake disc 1 developed by the brake shoes gripping the disc. This force is transferred to the frame by the plate springs through shoulders 91, 92, 93 and 94 on the frame members.

The brake shoe 14 is applied by a pair of biasing means generally indicated at 30. In some applications it may be necessary to use only a single biasing means. This biasing means includes a box comprising side plates 31 and 32 and end plates 33 and 34. The side plates 31 and 32 and the end plate 33 are welded together. The end plate 34 is secured to the end plate 33 and thus plates 31 and 32 by bolts 35. If desired, the box 30 may be of any other desired shape such as cylindrical.

Within the box 30 there is a cylinder 40 which extends through a hole 36 in the end plate 33. The cylinder 40 has a rounded head 41 which engages the spring 10. In order to force the brake shoe 14 into gripping engagement with the disc 1, a nest of Belleville washers or springs 42 is provided in each of the boxes 30. The inside edges of the springs 42 press against thrust rings 43 which bear against the leaf spring 10 and brake shoe 14.

The reaction of the inward thrust of the springs 42 is taken from the outside edges of the springs through thrust rings 44 which bear against the end or cover plate 34. The thrust on the end plate 34 is transferred to the side plate 32 of the box 30. The side plate 32 and, thus, the plates 31 and 33 are welded to or an integral part of a yoke 50.

There is one yoke 50 for the top portion of the brake and another for the bottom of the brake. The two yokes are secured together by the plate 32. Thus the two yokes 50 and the plates 31, 32 and 33 form a single unit. The bolt 51 secures the yoke 50 to the frame as it passes through holes in the plate 8. The bolt 51 is such that the yoke and thus the entire brake may pivot to a slight extent about the frame and the brake shoes are able to follow undulations in the brake disc. In order to facilitate this, each brake shoe is provided with a pair of projections 13 so that if either the brake shoe or the yoke moves with respect to the other, there will be positive contact between the brake shoes and the springs.

The force of the springs 42 is transferred to the yoke 50. The yoke or C-clamp transfers this force to an enlarged portion 53 of the yoke 50. An anvil 54 having a rounded head is threaded to the portion 53. A locking bar 56 is fastened to a portion 53 to insure that the anvil does not come loose. The force of the springs 42 is thus transferred through the yoke 50 to the anvil 54 and then to the spring 11 and brake shoe 15. The brake shoe 15 is thus forced into the disc 1 to the same extent as the brake shoe 14. The rounded head engages the leaf spring 11. The yoke or clamp 50 resists the braking force developed in a direction axial to the disc 1 when the brake shoes grip the disc.

Figure 5:
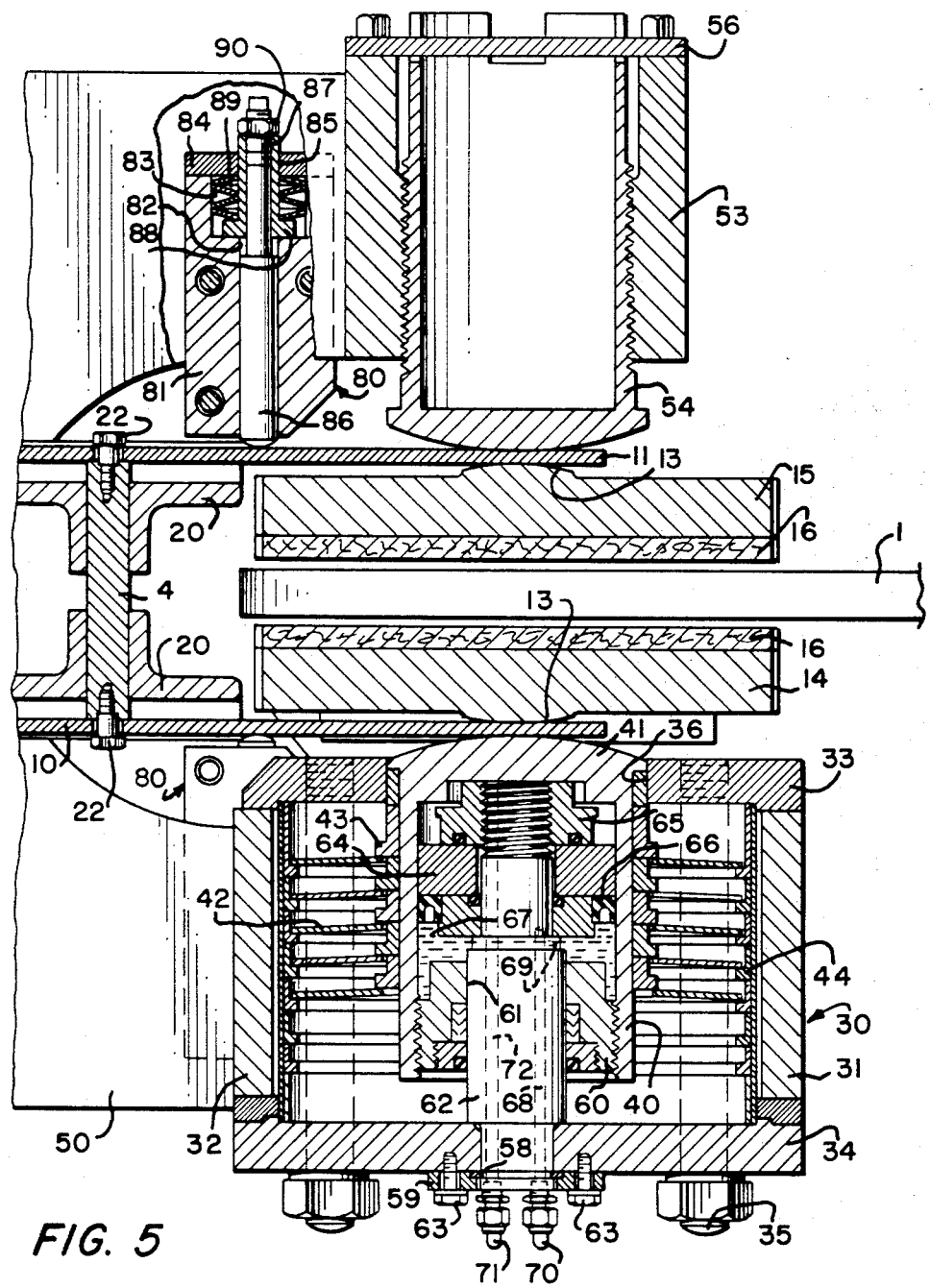
FIG. 5 is a fragmentary view of a portion of FIG. 2 with parts being enlarged for purposes of clarity and with the device in the brake-off position.

The force of the springs 42 is constant so the brakes are always applied in the absence of fluid pressure. Because thrust rings 43 and 44 are used, the failure of one spring will not result in the failure of all. The springs are said to be in parallel rather than in series. More braking force can be applied by adding more springs. Belleville washers are used because they provide an approximately constant spring rate over a wide range. This is required for even application of the brakes. Within limits, the brake effort varies only slightly as the brake shoes wear. To release the brakes, fluid under pressure is applied to the inside of the piston 40, as shown in FIG. 5, where the device is shown in the brake-off position.

A cylindrical member or end cover 60 is fixed to the inside of the cylinder 40 by threads. The cylinder 60 has an opening 61 therethrough to receive a piston rod 62. The rod is secured to the end plate 34 by a split ring 58 encircling the rod 62 and a cover 59 which engages the split ring and is held against the plate 34 by bolts 63. The upper portion of the piston rod has a piston 64 attached thereto by a nut 65. The piston 64 has packing 66, and is secured to the piston rod 62 so that there will be no relative movement between the box 30 and itself.

Fluid under pressure is admitted to the space 67 through passages 68 and port 69. Fluid is supplied through a conduit 70. As fluid under pressure is applied to the space 67, it acts on end cover 60 which is adapted to slide over piston rod 62. Since the piston 64 and rod 62 are secured against relative motion with respect to the plate 34, end cover 60 and cylinder 40 move downward with respect to the box 30 and compress the springs 42. The compression of the springs 42 relieves the force on the yoke 50 and thus the force on the anvil 54. The leaf springs 10 and 11 then force the brake shoes 14 and 15 out of gripping engagement with the disc 1.

A value (not shown) is connected to the conduit 70 which is opened to supply fluid under pressure to the space 67 to release the brakes and connected to an exhaust to relieve the pressure and exhaust the space 67 and thus apply the brakes. A second conduit 71 is connected to a passage 72 which connects the head end of the cylinder 40 to atmosphere and thereby prevents pressure from building up in the space ahead of the piston 64. If desired, the conduit 71 may be connected through suitable valving either to exhaust or a source of fluid under pressure. Fluid under pressure may then be applied directly to the cylinder head 41 to increase the braking effort.

If it is desired to apply or release the brakes gradually, the amount of fluid under pressure admitted to the space 67 and the pressure at which it is supplied can be increased or decreased at varying rates.

In order to insure that the clearance between the friction material 16 and disc 1 is equalized, a pair of centralizers 80 are secured to the bottom yoke 50. Each centralizer comprises a cylinder 81 having a bore 82 therethrough. The bore 82 is counterbored at 83 and provided with a cover 84 having a hole 85 therein. Slidably mounted within the bore 82 is a rod 86 which is adapted to engage a portion of the frame and preferably an extension (not shown) of the angle brace 20 and is threaded at its opposite end. An adjusting sleeve 87 provided with a flange 88 at one end is slidably mounted over the rod 86 and engages a stop formed by the counterbore 83. A plurality of Belleville washers 89 fit over the sleeve 87 and act between the flange 88 and the cover 84. If desired, the Belleville washers may be replaced by a helical spring. When the yoke moves counterclockwise, as viewed in the drawings, the rod is forced against the frame and the rod moves inward until the washers are flattened. The force of the springs 89 tend to keep the unit centered with respect to the disc 1. The extent of movement may be varied by movement of the nut 90 which moves the rod 86 inward. If the yoke moves in the opposite direction, the centralizer on the opposite side takes over and performs the same function.

Thus, it can be seen that the objects of this invention have been carried out. If the supply of fluid under pressure fails, the brakes are automatically applied. It is not necessary to have additional back-up means to apply the brakes if fluid pressure drops. If a brake disc is for some reason wavy, the brake shoes will follow the disc since the yoke and, thus, the brake shoes will pivot about the frame to some extent. By having one member, the yoke or clamp 50, resist the horizontal or axial component of the braking force and a second member, the leaf springs 10 and 11, resist the vertical or tangential component of the braking force, the entire brake system is stronger. The working stresses in these members can be calculated and kept low.

I claim:
1. A braking system, comprising:
   a disc mounted for rotation;
   a frame;
   a pair of brake shoes, carried by said frame, disposed on opposite sides of said disc;
   first means normally operative for urging one of said brake shoes into braking engagement with said disc;
   second means automatically reactive to said first means for urging the other of said brake shoes into braking engagement with said disc;
   means interposed between said brake shoes and said first and second means for movement of said brake shoes counter to the urging of said first and second means;
   means for admitting pressured fluid to one of said first and second means to overcome the urging thereof to permit said counter-movement means to release the braking engagements of both said shoes; and
   means for admitting pressured fluid to one of said first and second means to enhance the braking engagements of both said shoes.

2. The apparatus of claim 1, wherein:
   said counter-movement means comprise leaf springs mounted on said frame; and
   wherein said brake shoes are mounted on said leaf springs.

3. The apparatus of claim 1, wherein:
   said second means comprise a yoke coupled to said frame;
   said first means are carried on one branch of said yoke; and
   said first means comprise a box, a headed cylinder axially movable within said box, and resilient means interposed between said box and said cylinder to urge the head of said cylinder toward one of said brake shoes.

4. The apparatus, according to claim 3, wherein:
   said second means further comprise a headed anvil carried on the other branch of said yoke; and
   said yoke is pivotally coupled to said frame so that the urging of said cylinder head toward said one brake shoe is in part transferred to said yoke and, reactively, via said pivotal coupling, to said anvil to cause said anvil to move toward the other of said brake shoes.

5. The apparatus of claim 1, wherein:
said first means comprises a box having a cylinder movably mounted therein adapted to act directly on one of said brake shoes, at least one thrust ring surrounding said cylinder, spring means engaging said thrust ring for moving said cylinder and both said brake shoes toward said disc.

6. The apparatus of claim 5, wherein:
said spring means include at least one washer surrounding said cylinder.

7. The apparatus of claim 3, further comprising:
means mounted on said yoke for equalizing the clearance between said brake shoes and said disc.

8. The apparatus of claim 7, wherein:
said equalizing means is a spring-biased rod.

9. The apparatus, according to claim 1, wherein said first means comprise:
a box coupled to said frame;
a headed cylinder axially movable within said box;
resilient means interposed between said box and said cylinder to constrain the head of said cylinder against one of said brake shoes;
a piston rod fixed to, and extending internally in said box;
a piston fixed to said piston rod; and
an end cover fixed to said cylinder and slidably mounted on said rod;
said piston and end cover defining therebteween a sealed variable volume chamber; and
further comprising means for admitting pressured fluid to said variable volume chamber to move said end cover and said cylinder counter to the constraint of said resilient means to cause said cylinder head to withdraw from said one brake shoe.

10. The apparatus, according to claim 4, wherein:
said headed anvil is adjustable relative said other branch to vary the distance through which said anvil and said cylinder head are moved toward said brake shoes.

References Cited
UNITED STATES PATENTS

| | | | |
|---|---|---|---|
| 2,785,710 | 3/1957 | Mowery | 188—171 X |
| 3,159,247 | 12/1964 | Charlton | 188—170 |
| 3,185,259 | 5/1965 | Chouings | 188—216 X |
| 3,258,089 | 6/1966 | Hayes et al. | 188—73 |

FOREIGN PATENTS

| | | |
|---|---|---|
| 926,992 | 5/1963 | Great Britain. |

DUANE A. REGER, *Primary Examiner.*

U.S. Cl. X.R.
188—73, 216, 152